US010491890B1

(12) United States Patent
Yildiz et al.

(10) Patent No.: US 10,491,890 B1
(45) Date of Patent: Nov. 26, 2019

(54) SYSTEMS AND METHODS FOR AUTOMATIC ADJUSTMENT FOR VERTICAL AND ROTATIONAL IMBALANCE IN AUGMENTED AND VIRTUAL REALITY HEAD-MOUNTED DISPLAYS

(71) Applicant: Dell Products L.P., Round Rock, TX (US)

(72) Inventors: Yagiz Can Yildiz, Austin, TX (US); Anantha K. Boyapalle, Cedar Park, TX (US); Christopher A. Torres, San Marcos, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/978,827

(22) Filed: May 14, 2018

(51) Int. Cl.
*H04N 13/344* (2018.01)
*H04N 13/383* (2018.01)
(Continued)

(52) U.S. Cl.
CPC ....... *H04N 13/383* (2018.05); *G02B 27/0149* (2013.01); *G02B 27/0172* (2013.01); *G02B 27/0176* (2013.01); *G06F 3/04815* (2013.01); *G06T 7/20* (2013.01); *H04N 13/332* (2018.05); *H04N 13/344* (2018.05); *G02B 2027/0198* (2013.01)

(58) Field of Classification Search
CPC ............ G02B 27/0176; G02B 27/0093; H04N 13/383; H04N 13/332; H04N 13/344
See application file for complete search history.

(56) References Cited

U.S. PATENT DOCUMENTS

| 5,973,727 A * | 10/1999 | McGrew | G02B 27/017 345/5 |
| 2009/0147358 A1* | 6/2009 | Charlesworth | G02B 7/12 359/481 |

(Continued)

OTHER PUBLICATIONS

Lee et al., "Effects of Optical Combiner and IPD Change for Convergence of Near-Field Depth Perception in an Optical See-Through HMD", May 2016, IEEE Transactions on Visualization and Computer Graphics, vol. 22, No. 5 (Year: 2016).*

(Continued)

*Primary Examiner* — Robert J Hance
(74) *Attorney, Agent, or Firm* — Baker Botts L.L.P.

(57) ABSTRACT

Systems and methods are disclosed for automatic adjustment for vertical and rotational imbalance in a head mounted display. A controller may determine a first eye position relative to a first display and a second eye position relative to a second display based on eye tracking information from the eye tracking sensors. The controller may render a virtual object to a first ideal image by moving the virtual object in a first vertical direction and rotating the virtual object in a first rotational direction based on the first eye position. The controller may render the virtual object to a second ideal image by moving the virtual object in a second vertical direction and rotating the virtual object in a second rotational direction based on the second eye position. The controller may display the first ideal image on the first display and the second ideal image on the second display.

15 Claims, 10 Drawing Sheets

(51) Int. Cl.
*G06F 3/0481* (2013.01)
*G02B 27/01* (2006.01)
*G06T 7/20* (2017.01)
*H04N 13/332* (2018.01)

(56) References Cited

U.S. PATENT DOCUMENTS

| | | | |
|---|---|---|---|
| 2013/0050833 A1* | 2/2013 | Lewis | G06K 9/00604 359/630 |
| 2013/0235169 A1* | 9/2013 | Kato | G02B 27/01 348/53 |
| 2014/0132484 A1* | 5/2014 | Pandey | G02B 27/0172 345/8 |
| 2015/0015461 A1* | 1/2015 | Morimoto | G02B 27/017 345/8 |
| 2015/0312558 A1* | 10/2015 | Miller | G02B 27/017 348/54 |
| 2016/0026242 A1* | 1/2016 | Burns | H04N 9/31 345/633 |
| 2017/0221273 A1* | 8/2017 | Haseltine | G06F 3/011 |
| 2017/0353714 A1* | 12/2017 | Poulad | H04N 13/128 |
| 2018/0047202 A1* | 2/2018 | Long | G06T 11/00 |
| 2018/0096503 A1* | 4/2018 | Kaehler | G02B 27/0172 |
| 2018/0101014 A1* | 4/2018 | Bohn | G02B 27/0176 |

OTHER PUBLICATIONS

Bernard et al., "User Friendly Calibration for Tracking of Optical Stereo See-Through Head Worn Displays for Augmented Reality", 2017, 2017 Int'l Conference on Cyberworlds, (Year: 2017).*
Livingston, Mark A., et al. "Vertical vergence calibration for augmented reality displays." *Virtual Reality Conference*, 2006. IEEE, 2006.

* cited by examiner

800 — METHOD FOR AUTOMATIC ADJUSTMENT FOR VERTICAL AND
ROTATIONAL IMBALANCE IN A HEAD MOUNTED DISPLAY

802 — DETERMINING A FIRST EYE POSITION OF A FIRST EYE RELATIVE TO A FIRST DISPLAY OF A HEAD MOUNTED DISPLAY (HMD) BASED ON FIRST CAPTURED EYE TRACKING INFORMATION ASSOCIATED WITH THE FIRST EYE FROM A FIRST EYE TRACKING SENSOR OF THE HMD

804 — DETERMINING A SECOND EYE POSITION OF A SECOND EYE RELATIVE TO A SECOND DISPLAY OF THE HMD BASED ON SECOND CAPTURED EYE TRACKING INFORMATION ASSOCIATED WITH THE SECOND EYE FROM A SECOND EYE TRACKING SENSOR OF THE HMD

806 — RENDERING A VIRTUAL OBJECT TO A FIRST IDEAL IMAGE BY MOVING THE VIRTUAL OBJECT IN A FIRST VERTICAL DIRECTION AND ROTATING THE VIRTUAL OBJECT IN A FIRST ROTATIONAL DIRECTION BASED ON THE FIRST EYE POSITION AND A TILT OF THE HMD

808 — RENDERING THE VIRTUAL OBJECT TO A SECOND IDEAL IMAGE BY MOVING THE VIRTUAL OBJECT IN A SECOND VERTICAL DIRECTION AND ROTATING THE VIRTUAL OBJECT IN A SECOND ROTATIONAL DIRECTION BASED ON THE SECOND EYE POSITION AND THE TILT OF THE HMD

810 — DETERMINING WHETHER THE FIRST IMAGE FITS WITHIN THE FIRST IDEAL IMAGE AND THE SECOND IMAGE FITS WITHIN THE SECOND IDEAL IMAGE

812 — WHEN THE FIRST IMAGE FITS WITHIN THE FIRST IDEAL IMAGE AND THE SECOND IMAGE FITS WITHIN THE SECOND IDEAL IMAGE, DISPLAYING THE FIRST IDEAL IMAGE ON THE FIRST DISPLAY AND THE SECOND IDEAL IMAGE ON THE SECOND DISPLAY

FIG. 8

SYSTEMS AND METHODS FOR AUTOMATIC ADJUSTMENT FOR VERTICAL AND ROTATIONAL IMBALANCE IN AUGMENTED AND VIRTUAL REALITY HEAD-MOUNTED DISPLAYS

BACKGROUND

Field of the Disclosure

This disclosure relates generally to information handling systems and, more particularly, to systems and methods for automatic adjustment for vertical and rotational imbalance in augmented and virtual reality head-mounted displays.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include display devices, head mounted display devices, head mount display systems, desktop computers, server systems, microprocessors, controllers, microcontroller units, and/or combinations thereof.

SUMMARY

In one embodiment, a disclosed head mounted display may include a first display, a second display, a first eye tracking sensor that may capture eye tracking information associated with a first eye of a user wearing the head mounted display, a second eye tracking sensor that may capture eye tracking information associated with a second eye of the user, and a controller. The controller may determine a first eye position of the first eye relative to the first display that may be based on first captured eye tracking information associated with the first eye from the first eye tracking sensor. The controller may also determine a second eye position of the second eye relative to the second display that may be based on second captured eye tracking information associated with the second eye from the second eye tracking sensor. The controller may further render a virtual object to a first ideal image by movement of the virtual object in a first vertical direction that may be based on the first eye position. The controller may also render a virtual object to a second ideal image by movement of the virtual object in a second vertical direction that may be based on the second eye position. The controller may further determine whether the virtual object fits within the first ideal image and the virtual object fits within the second ideal image. The controller may also, when the virtual object may fit within the first ideal image and the virtual object may fit within the second ideal image, display the first ideal image on the first display and the second ideal image on the second display.

In a number of the disclosed embodiments of the head mounted display, the controller may also determine a first distance between an ocular center of the first eye and a center of the first display that may be based on the first eye position and determine a second distance between the ocular center of the second eye and a center of the second display that may be based on the second eye position. The movement of the virtual object in the first vertical direction may be further based on the first distance and the movement of the virtual object in the second vertical direction may be further based on the second distance.

In a number of the disclosed embodiments of the head mounted display, the controller may also determine a first angular difference between an angle of the first eye relative to the head mounted display and an angle of the first display relative to the head mounted display that may be based on the first eye position, and determine a second angular difference between an angle of the second eye relative to the head mounted display and an angle of the second display relative to the head mounted display that may be based on the second eye position. The render of the virtual object to the first ideal image may further include rotation of the virtual object in a first rotational direction that may be based on the first angular difference and a first tilt of the head mounted display. The render of the virtual object to the second ideal image may further include rotation of the virtual object in a second rotational direction that may be based on the second angular difference and the first tilt of the head mounted display.

In a number of the disclosed embodiments of the head mounted display, the controller may also, when one or more of a portion of the virtual object may be outside the first ideal image and a portion of the virtual object may be outside the second ideal image, adjust a first display position of the first display by movement of the first display in the first vertical direction using a first adjustment actuator of the head mounted display that may be based on a first distance between an ocular center of the first eye and a center of the first display and the first eye position, and adjust a second display position of the second display by movement of the second display in the second vertical direction using a second adjustment actuator of the head mounted display that may be based on a second distance between an ocular center of the second eye and a center of the second display and the second eye position.

In a number of the disclosed embodiments of the head mounted display, the controller may also, when one or more of a portion of the virtual object may be outside the first ideal image and a portion of the virtual object may be outside the second ideal image, adjust a first display position of the first display by rotation of the first display in a first rotational direction using a first adjustment actuator of the head mounted display that may be based on a first angular difference between an angle of the first eye relative to the head mounted display and an angle of the first display relative to the head mounted display, the first eye position, and a first tilt of the head mounted display and adjust a second display position of the second display by rotation of the second display in the second rotational direction using a second adjustment actuator of the head mounted display that may be based on a second angular difference between an angle of the second eye relative to the head mounted display and an angle of the second display relative to the head mounted display, the second eye position, and the first tilt.

In a number of the disclosed embodiments of the head mounted display, the head mounted display may also include an inside-out tracking device that may capture inside-out tracking information relative to a global ground coordinate associated with the head mounted display and an inertial measurement unit that may capture inertial measurement unit information associated with the head mounted display. The controller may also monitor a current position of the head mounted display, a third eye position of the first eye, and a fourth eye position of the second eye based on current inside-out tracking information captured by the inside-out tracking device, current inertial measurement unit information captured by the inertial measurement unit, third eye tracking information captured by the first eye tracking sensor, and fourth eye tracking information captured by the second eye tracking sensor. The controller may further determine whether the current position of the head mounted display, the third eye position, and the fourth eye position may have changed from a previous position of the head mounted display, the first eye position, and the second eye position. The controller may also, when at least one of the current position of the head mounted display, the third eye position, and the fourth eye position has changed position, perform another calibration process to compensate for the changes.

In a number of the disclosed embodiments of the head mounted display, the head mounted display may also include an inside-out tracking device that may capture inside-out tracking information relative to a global ground coordinate associated with the head mounted display and an inertial measurement unit that may capture inertial measurement unit information associated with the head mounted display. The controller may also determine a first position of the head mounted display and a first tilt of the head mounted display based on first inside-out tracking information captured by the inside-out tracking device and first inertial measurement unit information captured by the inertial measurement unit.

In a number of the disclosed embodiments of the head mounted display, the eye tracking information may comprise a position of an eye, a location of the eye, a pupil location of the eye, an ocular center of the eye, an angle of the eye, and a direction of gaze of the eye.

In a number of the disclosed embodiments of the head mounted display, the inside-out tracking information associated with the head mounted display may comprise a position of the head mounted display and a location of the head mounted display.

In a number of the disclosed embodiments of the head mounted display, the inertial measurement unit information associated with the head mounted display may comprise a position of the head mounted display, an orientation of the head mounted display, a linear acceleration of the head mounted display, and an angular velocity of the head mounted display.

In a second embodiment, a disclosed method may include determining a first eye position of a first eye of a user relative to a first display of a head mounted display that may be based on first captured eye tracking information associated with the first eye from a first eye tracking sensor of the head mounted display. The method may also include determining a second eye position of a second eye of the user relative to a second display of the head mounted display that may be based on second captured eye tracking information associated with the second eye from a second eye tracking sensor of the head mounted display. The method may further include rendering a virtual object to a first ideal image by moving the virtual object in a first vertical direction that may be based on the first eye position. The method may also include rendering a virtual object to a second ideal image by moving the virtual object in a second vertical direction that may be based on the second eye position. The method may further include determining whether the virtual object fits within the first ideal image and the virtual object fits within the second ideal image. The method may also include, when the virtual object may fit within the first ideal image and the virtual object may fit within the second ideal image, displaying the first ideal image on the first display and the second ideal image on the second display.

In a number of the disclosed embodiments of the method, the method may also include determining a first distance between an ocular center of the first eye and a center of the first display that may be based on the first eye position and determining a second distance between the ocular center of the second eye and a center of the second display that may be based on the second eye position. Moving the virtual object in the first vertical direction may be further based on the first distance and moving the virtual object in the second vertical direction may be further based on the second distance.

In a number of the disclosed embodiments of the method, the method may also include determining a first angular difference between an angle of the first eye relative to the head mounted display and an angle of the first display relative to the head mounted display that may be based on the first eye position, and determining a second angular difference between an angle of the second eye relative to the head mounted display and an angle of the second display relative to the head mounted display that may be based on the second eye position. Rendering the virtual object to the first ideal image may further include rotating the virtual object in a first rotational direction that may be based on the first angular difference and a first tilt of the head mounted display. Rendering the virtual object to the second ideal image may further include rotating the virtual object in a second rotational direction that may be based on the second angular difference and the first tilt of the head mounted display.

In a number of the disclosed embodiments of the method, the method may also include, when one or more of a portion of the virtual object may be outside the first ideal image and a portion of the virtual object may be outside the second ideal image, adjusting a first display position of the first display by moving the first display in the first vertical direction using a first adjustment actuator of the head mounted display that may be based on a first distance between an ocular center of the first eye and a center of the first display and the first eye position, and adjusting a second display position of the second display by moving the second display in the second vertical direction using a second adjustment actuator of the head mounted display that may be based on a second distance between an ocular center of the second eye and a center of the second display and the second eye position.

In a number of the disclosed embodiments of the method, the method may also include, when one or more of a portion of the virtual object may be outside the first ideal image and a portion of the virtual object may be outside the second ideal image, adjusting a first display position of the first display by rotating the first display in the first rotational direction using a first adjustment actuator of the head mounted display that may be based on a first angular difference between an angle of the first eye relative to the head mounted display and an angle of the first display relative to the head mounted display, the first eye position, and a first tilt of the head mounted display, and adjusting a second display position of the second display by rotating the second display in the second rotational direction using a second adjustment actuator of the head mounted display that may be based on a second angular difference between an angle of the second eye relative to the head mounted display and an angle of the second display relative to the head mounted display, the second eye position, and the first tilt.

In a number of the disclosed embodiments of the method, the method may also include monitoring a current position of the head mounted display, a third eye position of the first eye, and a fourth eye position of the second eye that may be based on current inside-out tracking information captured by the inside-out tracking device, current inertial measurement unit information captured by the inertial measurement unit, third eye tracking information captured by the first eye tracking sensor, and fourth eye tracking information captured by the second eye tracking sensor. The method may further include determining whether the current position of the head mounted display, the third eye position, and the fourth eye position may have changed from a previous position of the head mounted display, the first eye position, and the second eye position. The method may also include when at least one of the current position of the head mounted display, the third eye position, and the fourth eye position may have changed position, performing another calibration process that may compensate for the changes.

In a number of the disclosed embodiments of the method, the method may also include determining a first position of the head mounted display and a first tilt of the head mounted display that may be based on first inside-out tracking information captured by an inside-out tracking device of the head mounted display and first inertial measurement unit information captured by an inertial measurement unit of the head mounted display.

In a number of the disclosed embodiments of the method, the eye tracking information may comprise a position of an eye, a location of the eye, a pupil location of the eye, an ocular center of the eye, an angle of the eye, and a direction of gaze of the eye.

In a number of the disclosed embodiments of the method, the inside-out tracking information associated with the head mounted display may comprise a position of the head mounted display and a location of the head mounted display.

In a number of the disclosed embodiments of the method, the inertial measurement unit information associated with the head mounted display may comprise a position of the head mounted display, an orientation of the head mounted display, a linear acceleration of the head mounted display, and an angular velocity of the head mounted display.

In a third embodiment, a disclosed head mounted display may include a display including a first display area and a second display area, a first eye tracking sensor to capture eye tracking information associated with a first eye of a user wearing the head mounted display, a second eye tracking sensor to capture eye tracking information associated with a second eye of the user, and a controller. The controller may determine a first eye position of the first eye relative to the first display area of the display based on first captured eye tracking information associated with the first eye from the first eye tracking sensor. The controller may also determine a second eye position of the second eye relative to the second display area of the display based on second captured eye tracking information associated with the second eye from the second eye tracking sensor. The controller may further render a virtual object to a first ideal image by rotation of the virtual object in a first rotational direction based on the first eye position and render a virtual object to a second ideal image by rotation of the virtual object in a second rotational direction based on the second eye position. The controller may also determine whether the virtual object fits within the first ideal image and the virtual object fits within the second ideal image. The controller may further, when the virtual object fits within the first ideal image and the virtual object fits within the second ideal image, display the first ideal image on the first display area of the display and the second ideal image on the second display area of the display.

In a number of the disclosed embodiments of the head mounted display, the controller may determine a first angular difference between an angle of the first eye relative to the head mounted display and an angle of the first display area relative to the head mounted display based on the first eye position and determine a second angular difference between an angle of the second eye relative to the head mounted display and an angle of the second display area relative to the head mounted display based on the second eye position. The rotation of the virtual object in the first rotational direction may be based on the first angular difference and a first tilt of the head mounted display, and the rotation of the virtual object in the second rotational direction may be based on the second angular difference and the first tilt of the head mounted display.

In a number of the disclosed embodiments of the head mounted display, the controller may determine a first distance between an ocular center of the first eye and a center of the first display area based on the first eye position and determine a second distance between the ocular center of the second eye and a center of the second display area based on the second eye position. The render of the virtual object to the first ideal image further comprises movement of the virtual object in a first vertical direction based on the first distance and the render of the virtual object to the second ideal image further comprises movement of the virtual object in a second vertical direction based on the second distance.

In a number of the disclosed embodiments of the head mounted display, the controller may also, when one or more of a portion of the virtual object is outside the first ideal image and a portion of the virtual object is outside the second ideal image, adjust a display position of the display by movement of the display in a third vertical direction and rotation of the display in a third rotational direction using an adjustment actuator of the head mounted display based on the first eye position, the second eye position, and a first tilt of the head mounted display.

In a number of the disclosed embodiments of the head mounted display, the controller may also include an inside-out tracking device to capture inside-out tracking information relative to a global ground coordinate associated with the head mounted display and an inertial measurement unit to capture inertial measurement unit information associated with the head mounted display. The controller may also monitor a current position of the head mounted display, a third eye position of the first eye relative to the first display area, a fourth eye position of the second eye relative to the second display area, based on current inside-out tracking information captured by the inside-out tracking device, current inertial measurement unit information captured by the inertial measurement unit, third eye tracking information captured by the first eye tracking sensor, and fourth eye tracking information captured by the second eye tracking sensor. The controller may further determine whether the current position of the head mounted display, the third eye position, and the fourth eye position, have changed from a previous position of the head mounted display, the first eye position, and the second eye position. The controller may also, when at least one of the current position of the head mounted display, the third eye position, and the fourth eye position has changed position, perform another calibration process to compensate for the changes.

BRIEF DESCRIPTION OF THE DRAWINGS

For a more complete understanding of the present invention and its features and advantages, reference is now made to the following description, taken in conjunction with the accompanying drawings, in which:

FIG. 8 is flowchart depicting selected elements of an embodiment of a method for automatic adjustment for vertical and rotational imbalance for a head mounted display.

DESCRIPTION OF PARTICULAR EMBODIMENT(S)

Figure 1:
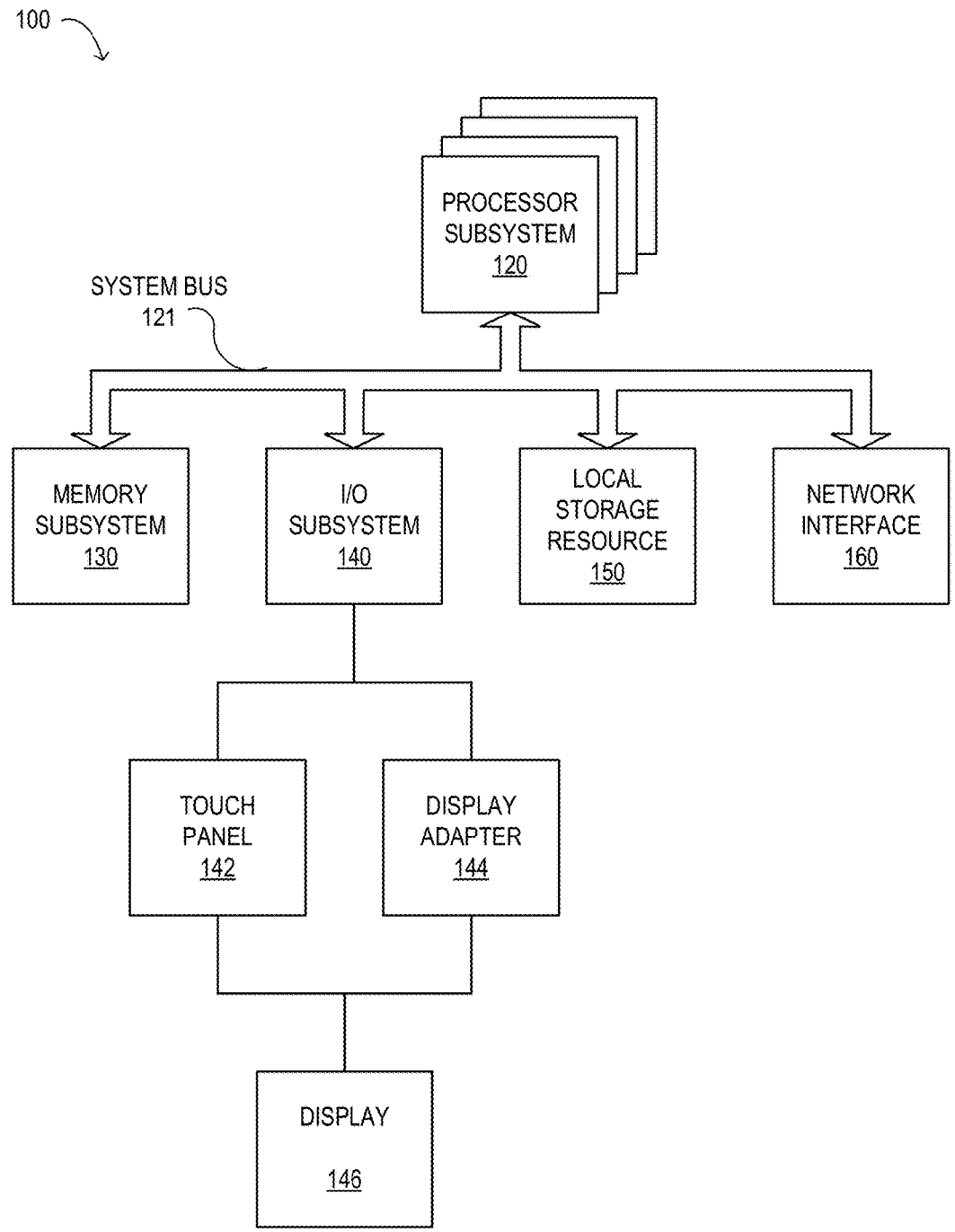
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-11 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network. Network interface 160 may enable information handling system 100 to communicate over the network using a suitable transmission protocol and/or standard, including, but not limited to, transmission protocols and/or standards enumerated below with respect to the discussion of the network. In some embodiments, network interface 160 may be communicatively coupled via the network to a network storage resource. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in a network storage resource, not shown).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. As shown, I/O subsystem 140 may comprise touch panel 142 and display adapter 144. Touch panel 142 may include circuitry for enabling touch functionality in conjunction with display 146 that is driven by display adapter 144.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/ within system 100. In addition to local storage resources 150, in some embodiments, information handling system 100 may communicatively couple via network 165 to a network storage resource (not shown) using network interface 160 discussed below.

Network interface 160 may be a suitable system, apparatus, or device operable to serve as an interface between information handling system 100 and network 165. Network interface 160 may enable information handling system 100 to communicate over a network using any suitable transmission protocol and/or standard, including, but not limited to various transmission protocols and/or standards. The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data or information). In some embodiments, the network communicatively coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network, network interface 160, and/or various components associated therewith may be implemented using hardware, software, or any combination thereof. Network interface 160 may enable wired and/or wireless communications to and/or from information handling system 100.

As noted previously, an information handling system may include a head mounted display device. A head mounted display may comprise a head mounted virtual reality display, a head mounted augmented reality display, a head mounted mixed reality display, or another type of head mounted display. A Typical head mounted display includes a display device and straps coupled to the display device to allow the head mounted display to be worn by a user. A user wears the head mounted display by placing the head mounted display on their head with a visor portion of the head mounted display positioned in front of their face and looking straight toward a display of the visor portion. A user may have various asymmetries including an asymmetrical head shape, asymmetrical facial features, uneven eye sizes, uneven pupil sizes, eye disorders such as disassociated vertical distance, or other asymmetries. These various asymmetries may cause the head mounted display to be tilted on the user's head, asymmetrical optical/ocular center heights between an ocular center of a user's eye and a center of a display associated with the respective eye, horizontal, vertical, or rotational asymmetries or imbalances. In continuous operation, the head mounted display may shift slightly on the user's head due to a loose fit of the head mounted display or continuous motion of a user's head, which may cause the position of the head mounted display to change relative to the users eyes, the position of the user's eyes to change relative to the display associated with each eye, or other vertical or rotational imbalances. When a user is wearing a head mounted display, the user views an image with the user's right eye, a right eye image, and views the same image with the user's left eye, a left eye image. The user's eyes co-merge the right eye image and the left eye image into a combined image. In typical head mounted displays that are unable to adjust for the vertical and rotational asymmetries and imbalances, the combined image viewed by the user may be a double combined image due to vertical misalignment, a double combined image due to rotational misalignment, a double combined image due to vertical and rotational misalignments, or other types of out of focus and reduced quality images.

As will be described in further detail herein, the inventors of the present disclosure have discovered methods and systems for automatic adjustment for vertical and rotational imbalance in a head mounted display. The head mounted display utilizes eye tracking information, inside-out tracking information, and inertial measurement unit information to automatically identify and adjust for any vertical and rotational asymmetries and imbalances, which allows the head mounted display to be calibrated for the user. The head mounted display utilizes rendering schemes to compensate for minor cases of asymmetry and imbalance and uses a combination of mechanical adjustments and rendering schemes for more major cases. For example, the head mounted display may render a virtual object to an ideal image for each eye separately by rotating and moving the virtual object in horizontal, vertical, and rotational directions to bring the virtual object in focus to the ocular center of the eye and the center of a respective display of the head mounted display with the right orientation based on the position of the eye and a tilt of the head mounted display. The head mounted display may display the ideal image for the right eye on the respective right display and the ideal image for the left eye on the respective left display, which may result in an aligned combined image. These rendering schemes and mechanical adjustments allow a user to view a combined image that is high quality, aligned, and in focus. Utilizing eye tracking information, inside-out tracking information, and inertial measurement unit information provides continuous calibration of the head mounted display to a user even when the head mounted display shifts or changes position on the user's head during operation.

Figure 2:
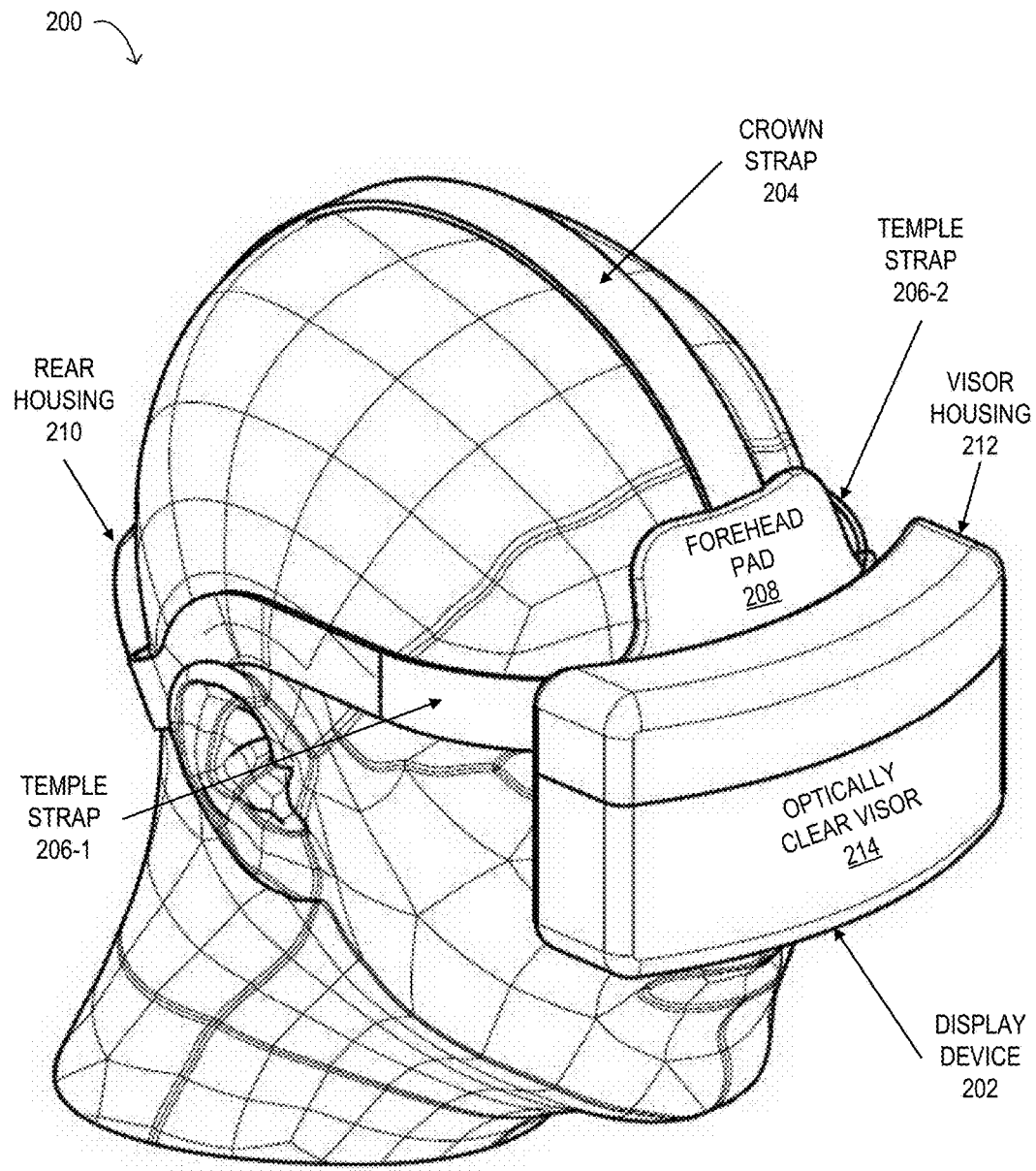
FIG. 2 is a three quarter view of selected elements of an embodiment of a head mounted display.

FIG. 2 depicts a three quarter view of selected elements of an embodiment of a head mounted display 200. As shown in FIG. 2, head mounted display 200 includes a display device 202, a plurality of straps including a crown strap 204, a temple strap 206-1, and a temple strap 206-2, a forehead pad 208, and a rear housing 210. Head mounted display 200 may comprise a head mounted virtual reality display, a head mounted augmented reality display, a head mounted mixed reality display, or another type of head mounted display. Display device 202 may include a visor housing 212 and an optically clear visor 214 coupled proximate a front side of visor housing 212. Forehead pad 208 may be coupled to visor housing 212 proximate a top side of visor housing 212. Crown strap 204 may include a first end coupled to visor housing 212 proximate a top center portion of visor housing 212 and a second end coupled to rear housing 210 proximate a top center portion of rear housing 210. Temple strap 206-1 may include a first end coupled to forehead pad 208 proximate a first side visor housing 212 and a second end coupled to rear housing 210 proximate a first side of rear housing 210. Temple strap 206-2 may include a first end coupled to forehead pad 208 proximate a second side of visor housing 212 opposite the first side of visor housing 212 and a second end coupled to rear housing 210 proximate a second side of rear housing 210 opposite the first side of rear housing 210. In FIG. 2, a user is shown wearing head mounted display 200 on their head with display device 202 positioned in front of their face and looking straight toward optically clear visor 214.

During operation, head mounted display 200 may perform an automatic adjustment process for vertical and rotational imbalance to identify any asymmetries and imbalances and compensate for the asymmetries and imbalances detected. Head mounted display 200 may perform an initial automatic adjustment process when a user places head mounted display 200 on the user's head to calibrate head mounted display 200 for the user. Head mounted display 200 may also perform a continuous automatic adjustment process while the user continues wearing the device to automatically compensate for any changes in the position of head mounted display 200 on the user's head that may occur while using the device. For example, head mounted display 300 may be tilted on a user's head that may be caused by an asymmetrical head shape, an asymmetrical face shape, a slight displacement of head mounted display 300 that may occur during continuous usage, among other causes. Other imbalances may include asymmetrical optical/ocular center height that may be caused by facial asymmetries, differences in inter-pupillary distance between a user's eyes, one eye may be higher or lower than the other eye, uneven eye size of a user's eyes, uneven pupil size of a user's eyes, orientation of one eye may be different than the other eye such as the one eye may be slightly rotated from the other, eye disorders such as disassociated vertical distances, strabismus, constant strabismus, or hypertropia, or other differences between the two eyes. These automatic adjustment processes allow the user to see in focus, high quality, and ideal images on the display device 202 and are described in further detail below.

Figure 3:
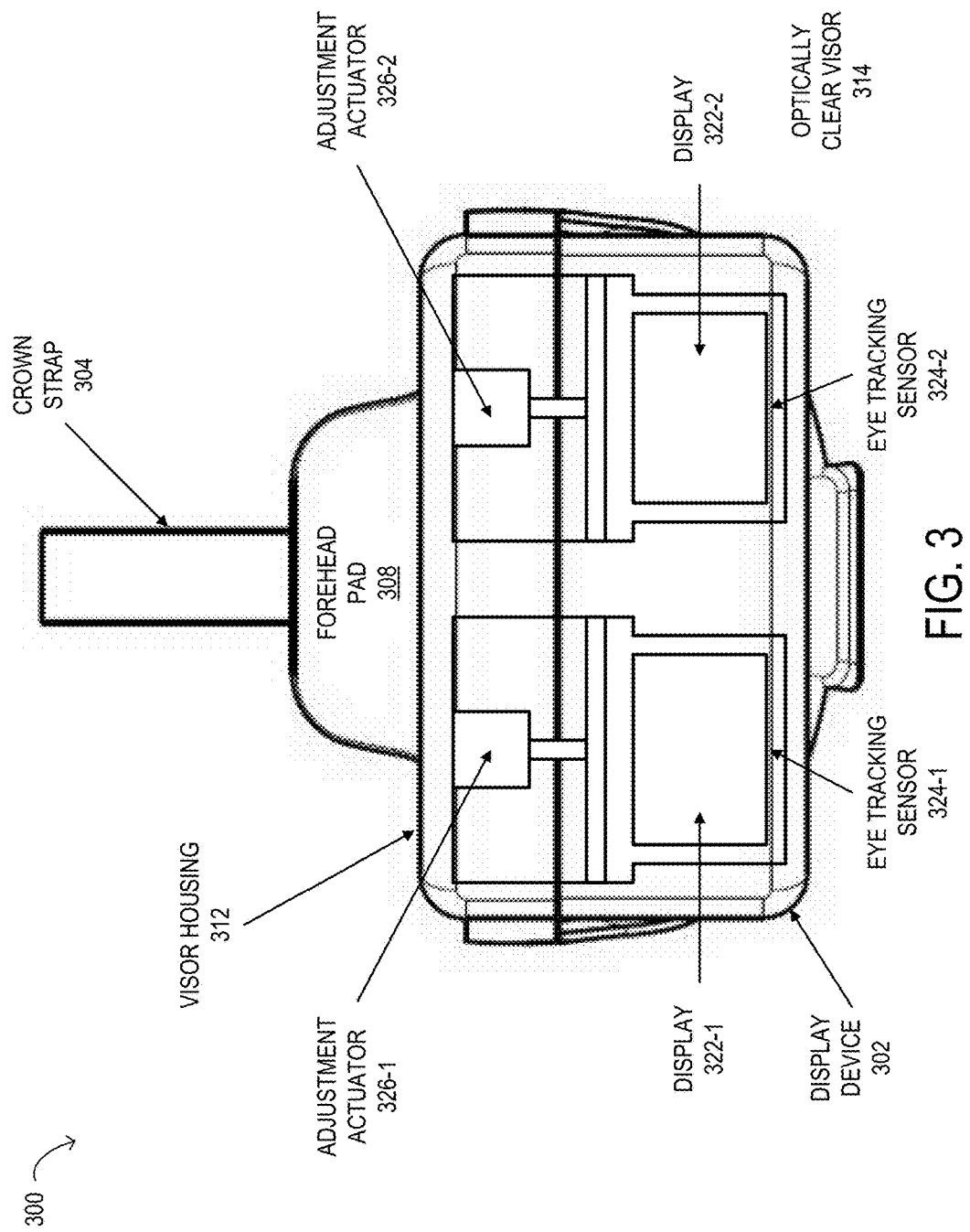
FIG. 3 is a front view of selected elements of an embodiment of a head mounted display.

Turning now to FIG. 3, a front view of selected elements of an embodiment of a head mounted display 300 is depicted. Head mounted display 300 is structurally and functionally similar to head mounted display 200 described above with reference to FIG. 2. Head mounted display 300 includes a display device 302, a crown strap 304, a forehead pad 308, a visor housing 312, and an optically clear visor 314 coupled to visor housing 312. Display device 302 may include various components including displays 322 including displays 322-1 and 322-2, eye tracking sensors 324 including eye tracking sensors 324-1 and 324-2, adjustment actuators 326 including adjustment actuators 326-1 and 326-2, and lenses (not illustrated), which may be in visor housing 312. Each display 322 may comprise a liquid crystal display (LCD), an optical projection system, a monitor, or another type of display device. For example, head mounted display 300 may display a rendered image of a virtual object on an LCD or monitor type of display 322 or project the rendered image onto optically clear visor 314. Each display 322 may be associated with a respective eye of a user. For example, display 322-1 may be associated with the right eye and display 322-2 may be associated with the left eye. Each display 322 may also be associated with a respective lens for a respective eye of a user. For example, display 322-1 may be associated with a right eye lens for the right eye and display 322-2 may be associated with a left eye lens for the left eye. Each eye tracking sensor 324 may be located proximate a perimeter of each respective lens, proximate a bottom portion of each lens, or at another location of each respective lens. Each eye tracking sensor 324 may be associated with a respective eye of a user. For example, eye tracking sensor 324-1 may be associated with the right eye and eye tracking sensor 324-2 may be associated with the left eye. Each eye tracking sensor 324 may capture eye tracking information associated with a respective eye of the user. The eye tracking information may comprise one or more of a position of an eye, a location of an eye, a pupil location of an eye, an ocular center of an eye, an angle of an eye, and a direction of gaze of an eye, and other types of eye tracking information. Each adjustment actuator 326 may comprise a drive pinion, a drive stepper motor, and a drive rack, or another type of adjustment actuator. Each adjustment actuator 326 may be coupled to a respective display 322. For example, adjustment actuator 326-1 may be coupled to display 322-1 and adjustment actuator 326-2 may be coupled to display 322-2. Each adjustment actuator 326 may mechanically adjust a position of a respective display 322. Each adjustment actuator 326 may mechanically adjust the position of the respective display 322 by moving the position of the respective display 322 in a vertical direction. In one or more embodiments, each adjustment actuator 326 may also mechanically adjust the position of the respective display 322 by rotating the position of the respective display 322 in a rotational direction.

Head mounted display 300 may also include an inside-out tracking device to capture inside-out tracking information relative to a global ground coordinate associated with head mounted display 300 and an inertial measurement unit to capture inertial measurement unit information associated with head mounted display 300. The inside-out tracking device may comprise a camera and a simultaneous localization and mapping (SLAM) subsystem. The SLAM subsystem may provide localization and mapping of a user's environment. The inside-out tracking information may comprise a position of head mounted display 300, a location of head mounted display, environmental information of the user's environment including surface information, depth information, distance information of objects surrounding the user, or other types of environment information and conditions, or combinations thereof, associated with head mounted display 300 and the user's environment. The inertial measurement unit may comprise an accelerometer, a gyroscope, a magnetometer, an optical sensor, a global position system (GPS) device, or other types of devices. The inertial measurement unit information may comprise a position of head mounted display 300, an orientation of head mounted display 300, a linear acceleration of head mounted display 300, and an angular velocity of head mounted display 300.

Head mounted display 300 may also comprise one or more user input interfaces such as buttons disposed in head mounted display 300, a voice recognition device, a gesture recognition device, a motion detection device, an adjustment input device, or another type of user input interface device, that a user may use to provide user input data and commands to head mounted display 300. In one or more embodiments, head mounted display 300 may also be coupled to an information handling system such as information handling system 100.

A user may initiate an initial calibration process disclosed herein, also referred herein as an automatic adjustment for vertical and rotational imbalance process, to identify any asymmetries and imbalances and compensate for the asymmetries and imbalances detected. In some embodiments, the user may initiate the calibration process by placing head mounted display 300 on their head with display device 302 positioned in front of their face and looking straight toward optically clear visor 314, and providing user input, such as a user input command, to head mounted display 300 using at least one of the user input interfaces to begin the calibration process. For example, the user may push a button, use a voice command, or perform a hand gesture to initiate the automatic adjustment process. In one or more other embodiments, head mounted display 300 may automatically initiate the calibration process by detecting when the user places head mounted display 300 on their head.

During operation, head mounted display 300 may monitor a current position of head mounted display 300, a current position of each eye relative to head mounted display 300, and a current distance between the ocular center of each eye and the center of each respective display 322 based on current inside-out tracking information captured by the inside-out tracking device, current inertial measurement unit information captured by the inertial measurement unit and current eye tracking information for each eye captured by each respective eye tracking sensor 324. Head mounted display 300 may compare the current position of head mounted display 300, the current position of each eye relative to head mounted display 300, and the current distance between the ocular center of each eye and the center of each respective display 322 with the previous position of head mounted display 300, the previous position of each eye relative to head mounted display 300, and the previous distance between the ocular center of each eye and the center of each respective display 322 of the previous calibration information. When the comparison indicates that one or more of the current position of head mounted display 300, the current position of each eye relative to head mounted display 300, and the current distance between the ocular center of each eye and the center of each respective display 322 is different than their previous values, head mounted display 300 may run another calibration process to identify any current asymmetries and imbalances and compensate for the current asymmetries and imbalances detected. When the other calibration process is the immediate subsequent process of the initial calibration process, the previous calibration information may be the initial calibration information based on the initial calibration process.

Figure 4:
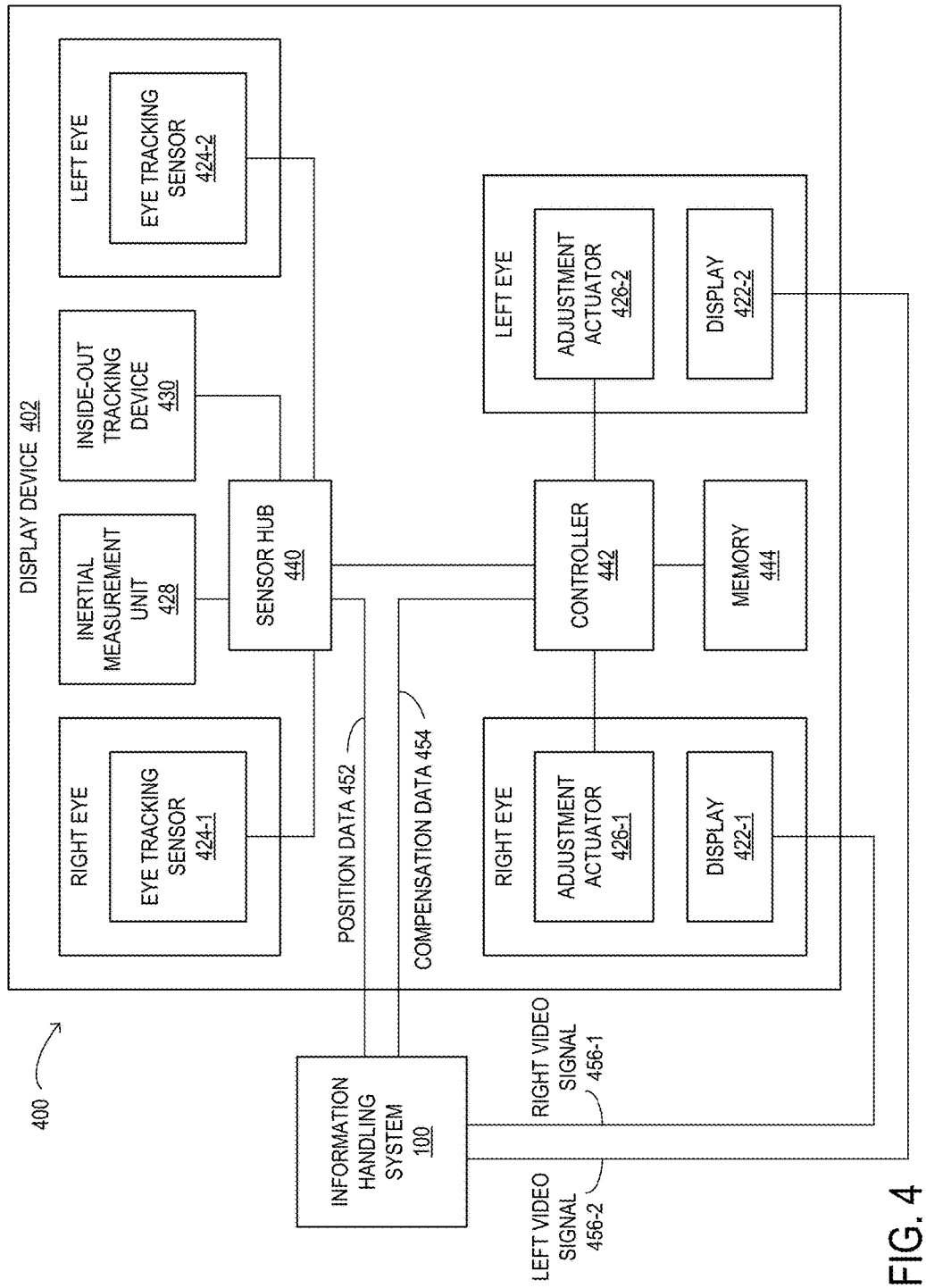
FIG. 4 is a block diagram of selected elements of an embodiment of a head mounted display coupled to an information handling system.

FIG. 4 is a block diagram of selected elements of an embodiment of a head mounted display 400 coupled to an information handling system 100. Head mounted display 400 is structurally and functionally similar to head mounted display 300 described above with reference to FIG. 3. Head mounted display 400 comprises display device 402 including displays 422 including displays 422-1 and 422-2, eye tracking sensors 424 including eye tracking sensors 424-1 and 424-2, adjustment actuators 426 including adjustment actuators 426-1 and 426-2, an inertial measurement unit 428, an inside-out tracking device 430, a sensor hub 440, a controller 442, and a memory 444. Sensor hub 440 is coupled to eye tracking sensors 424-1 and 424-2, inertial measurement unit 428, an inside-out tracking device 430, controller 442, and information handling system 100. Controller 442 is coupled to adjustment actuators 426-1 and 426-2, memory 444, and information handling system 100. As shown, display 422-1, tracking sensor 424-1, and adjustment actuator 426-1 are associated with a right eye of a user and display 422-2, tracking sensor 424-2, and adjustment actuator 426-2 are associated with a left eye of the user. Sensor hub 440 may transmit position data 452 to information handling system 100. Information handling system 100 may transmit compensation data 454 to controller 442. In some embodiments, sensor hub 400 may transmit position data 452 to controller 442 and controller 442 may utilize position data 452 to generate compensation data 454. Information handling system 100 may transmit a right video signal 456-1 to the right display 422-1 and a left video signal 456-2 to the left display 422-2.

As previously described, a user may place head mounted display 400 on their head with display device 402 positioned in front of their face and looking straight toward displays 422 and provide user input to head mounted display 400 to begin a calibration process. During an identification phase of the calibration process, controller 442 may determine a position of head mounted display 400 and a tilt of head mounted display 400 relative to global ground coordinate based on inertial measurement unit information captured by inertial measurement unit 428 and inside-out tracking information captured by inside-out tracking device 430. Then, controller 442 may normalize inertial measurement unit information of inertial measurement unit 428 and inside-out tracking information of inside-out tracking device 430 for an upright position of head mounted display 400 based on the first tilt of head mounted display 400. Next, controller 442 may identify a right eye position, a right eye location, and a right eye orientation of the right eye relative to the right display 422-1 based on eye tracking information from the right eye tracking sensor 424-1, and a left eye position, a left eye location, and a left eye orientation of the left eye relative to the left display 422-2 based on eye tracking information from the left eye tracking sensor 424-2. Controller 442 may determine a first distance between an ocular center of the right eye and a center of the right display 422-1 based on the right eye position of the right eye, and a second distance between an ocular center of the left eye and a center of the left display 422-2 based on the left eye position of the left eye. Controller 442 may also determine a first angular difference between an angle of the right eye relative to head mounted display 400 and an angle of the right display 422-1 relative to head mounted display 400 based on the right eye position of the right eye, and a second angular difference between an angle of the left eye relative to head mounted display 400 and an angle of the left display 422-2 relative to head mounted display 400 based on the left eye position of the left eye.

Next, controller 442 may enter a compensation phase of the calibration process. During the compensation phase of the calibration process, controller 442 may render a virtual object to a first ideal image for the right eye by moving the virtual object in a first vertical direction based on the right eye position and rotating the virtual object in a first rotational direction based on the first angular difference and the tilt of head mounted display 400 to bring the virtual object in focus to the ocular center of the right eye. Controller 442 may also render the virtual object to a second ideal image for the left eye by moving the virtual object in a second vertical direction based on the left eye position and rotating the virtual object in a second rotational direction based on the second angular difference and the initial tilt of head mounted display 400 to bring the virtual object in focus to the ocular center of the left eye. Next, controller 442 may determine whether the virtual object fits within the first ideal image and the virtual object fits within the second ideal image. Controller 442 may determine a perimeter of an area of the virtual object within a two-dimensional space, determine a perimeter of an area of an ideal image within the two-dimensional space, and determine whether the perimeter of the area of the virtual object within the two-dimensional space fits entirely inside the perimeter of the area of the ideal image within the two-dimensional space. When the perimeter of the area of the virtual object within the two-dimensional space fits entirely inside the perimeter of the area of the ideal image within the two-dimensional space, the virtual object fits within the ideal image. When the virtual object fits within the first ideal image and the virtual object fits within the second ideal image, controller 442 may display the first ideal image on the right display 422-1 and the second ideal image on the left display 422-2.

When controller 442 is unable to render the first ideal image to bring the virtual object in focus to the ocular center of the right eye, e.g. a portion of the virtual object may be outside the first ideal image, to compensate for the entire ocular center height of the right eye, controller 442 may use mechanical compensation to resolve this issue. Controller 442 may adjust the position of the right display 422-1 by moving the right display 422-1 in the first vertical direction using the right adjustment actuator 426-1 based on the first distance. When controller 442 is unable to compensate for the entire ocular center height of the left eye and render the second ideal image to bring the virtual object in focus to the ocular center of the left eye, controller 442 may adjust the position of the left display 422-2 by moving the left display 422-2 in the second vertical direction using the left adjustment actuator 426-2 based on the second distance.

In one or more embodiments, controller 442 may also use mechanical compensation to resolve angular differences. When a portion of the virtual object may be outside the first ideal image, controller 442 may adjust the position of the right display 422-1 by rotating the right display 422-1 in the first rotational direction using the right adjustment actuator 426-1 based on the first angular difference. When a portion of the virtual object may be outside the second ideal image, controller 442 may adjust the position of the left display 422-2 by rotating the left display in the second rotational direction using the left adjustment actuator 426-2 based on the second angular difference.

When controller 442 has adjusted the position of the right display 422-1 and the position of the left display 422-2, controller 442 may re-run the identification and calibrations phases of the calibration process to ensure that the virtual image is in focus and fits within the right and left rendered ideal images. Once the virtual image is in focus and fits within the right and left rendered ideal images, controller 442 may save the initial calibration information of the initial calibration process.

During operation, controller 442 may enter a continuous usage phase of the automatic adjustment for vertical and rotational imbalance process for head mounted display 400. Controller 442 may monitor a current position of head mounted display 400, a current eye position, a current location, and a current orientation of each eye relative to head mounted display 400, and a current distance between the ocular center of each eye and the center of each respective display 422 based on current inside-out tracking information captured by inside-out tracking device 430, current inertial measurement unit information captured by inertial measurement unit 428, and current eye tracking information for each eye captured by each respective eye tracking sensor 424. Controller 442 may compare the current position of head mounted display 400, the current position of each eye relative to head mounted display 400, and the current distance between the ocular center of each eye and the center of each respective display 422 with the previous position of head mounted display 400, the previous position of each eye relative to head mounted display 400, and the previous distance between the ocular center of each eye and the center of each respective display 422 of the previous calibration information. When the comparison indicates that one or more of the current position of head mounted display 400, the current position of each eye relative to head mounted display 400, or the current distance between the ocular center of each eye and the center of each respective display 422 is different than their previous values, controller 442 may run another calibration process to identify and compensate for any current asymmetries and imbalances detected.

Figure 5A:
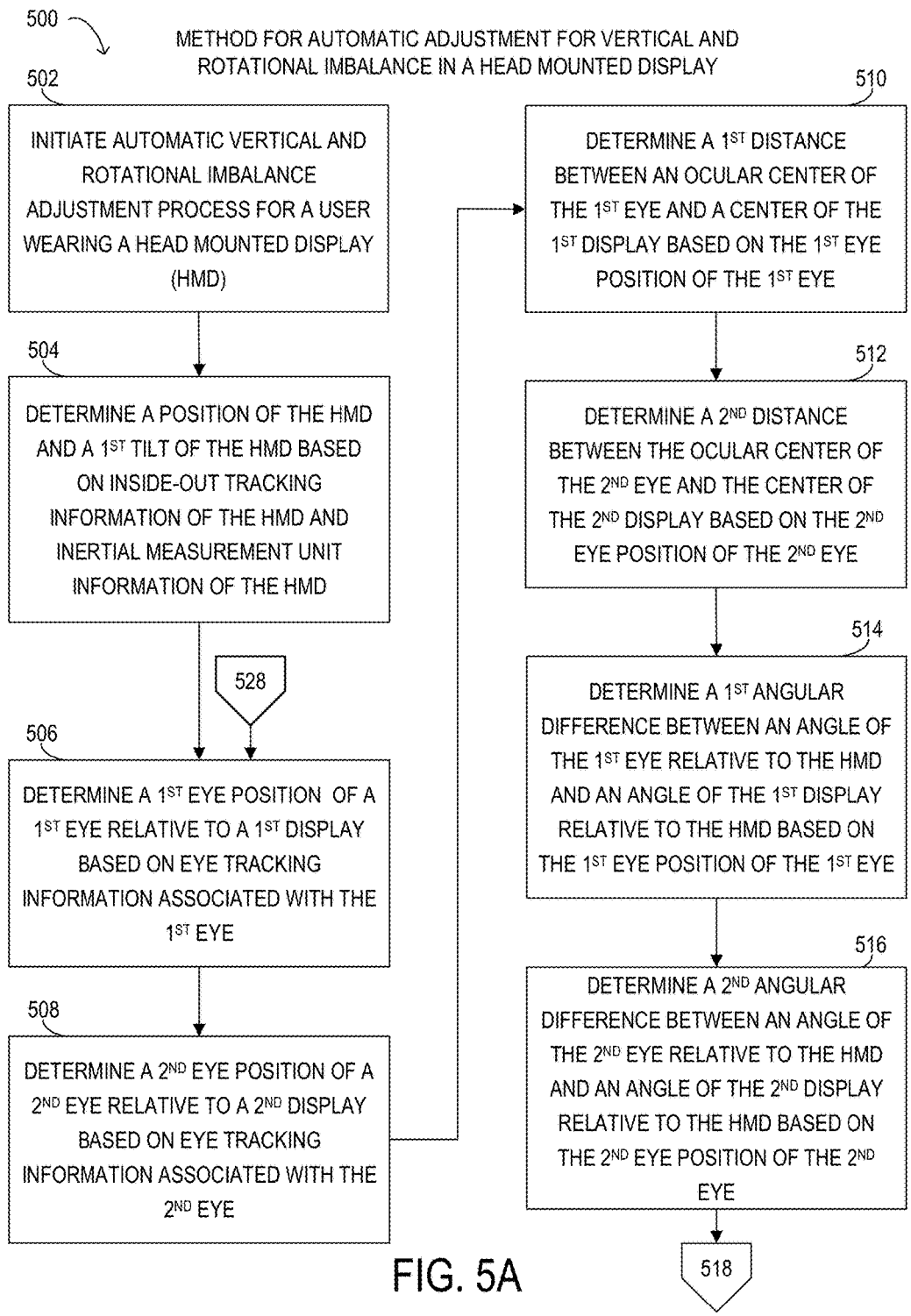
FIGS. 5A and 5B depict a flowchart of selected elements of an embodiment of a method for automatic adjustment for vertical and rotational imbalance in a head mounted display.
Figure 5B:
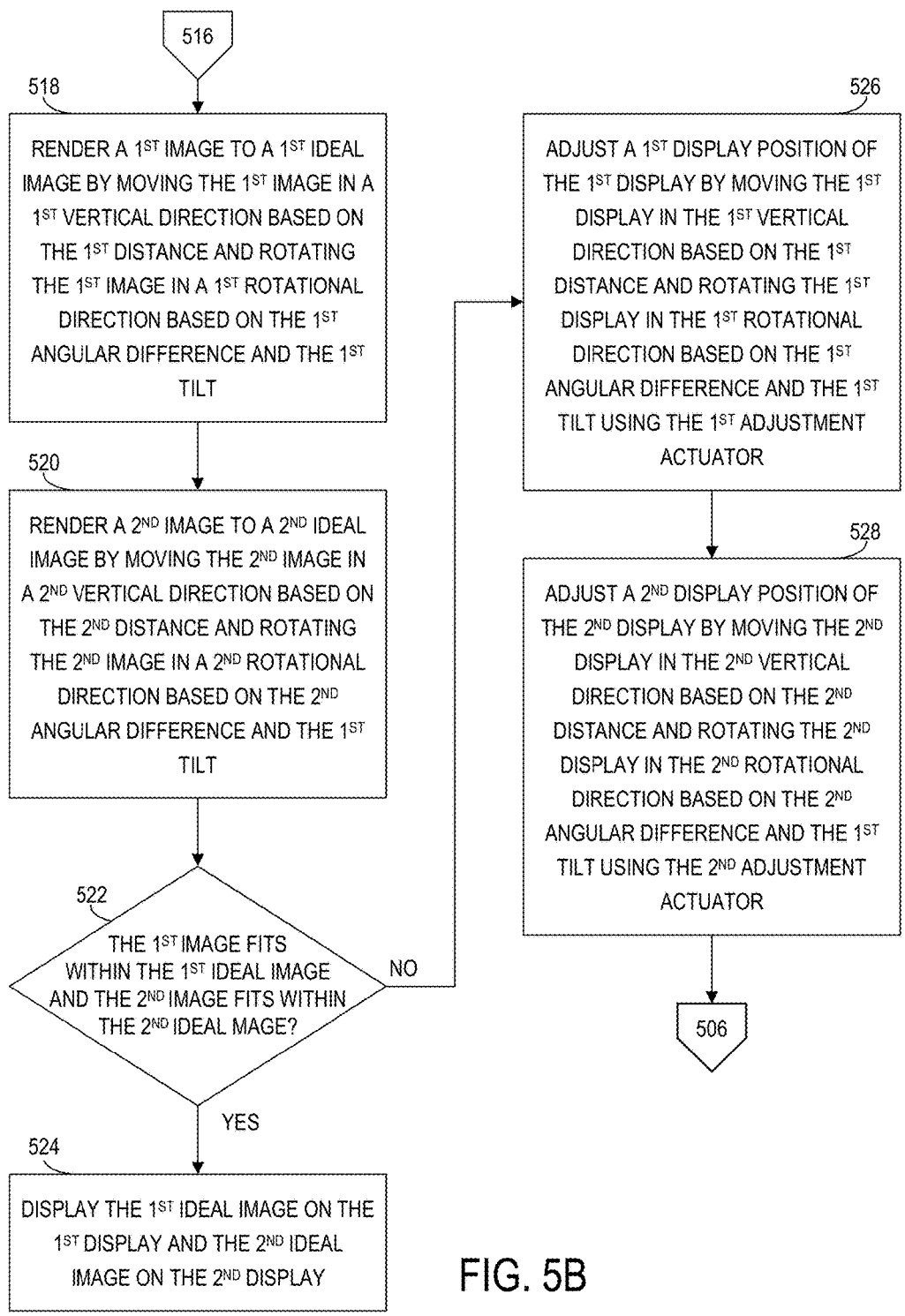

FIGS. 5A and 5B depict a flowchart of selected elements of an embodiment of a method 500 for automatic adjustment for vertical are rotational imbalance in a head mounted display. Method 500 may be performed by head mounted display 200, head mounted display 300, head mounted display 400, or information handling system 100 coupled to head mounted display 200, head mounted display 300, or head mounted display 400 previously described with reference to FIGS. 1, 2, 3, and 4, or another type of head mounted display or head mounted display system. It is noted that certain operations described in method 500 may be optional or may be rearranged in different embodiments.

Method 500 may begin at step 502, initiate an automatic adjustment for vertical and rotational imbalance adjustment process for a user wearing a head mounted display. At step 504, determine a position of the head mounted display and a first tilt of the head mounted display based on inside-out tracking information of the head mounted display and inertial measurement unit information of the head mounted display. At step 504, determine a first eye position of a first eye relative to a first display based on eye tracking information associated with the first eye. At step 508, determine a second eye position of a second eye relative to a second display based on eye tracking information associated with the second eye. At step 510, determine a first distance between an ocular center of the first eye and a center of the first display based on the first eye position of the first eye. At step 512, determine a second distance between the ocular center of the second eye and the center of the second display based on the second eye position of the second eye. At step 514, determine a first angular difference between an angle of the first eye relative to the head mounted display and an angle of the first display relative to the head mounted display based on the first eye position of the first eye. At step 516, determine a second angular difference between an angle of the second eye relative to the head mounted display and an angle of the second display relative to the head mounted display based on the second eye position of the second eye. At step 518, render a first image to a first ideal image by moving the first image in a first vertical direction based on the first distance and rotating the first image in a first rotational direction based on the first angular difference and the first tilt. At step 520, render a second image to a second ideal image by moving the second image in a second vertical direction based on the second distance and rotating the second image in a second rotational direction based on the second angular difference and the first tilt. At step 522, determine whether the first image fits within the first ideal image and the second image fits within the second ideal mage. When the first image fits within the first ideal image and the second image does fits within the second ideal mage, method 500 may proceed to step 524. When the first image does not fit within the first ideal image or the second image does not fit within the second ideal mage, method 500 may proceed to step 526. At step 524, display the first ideal image on the first display and the second ideal image on the second display. At step 526, adjust a first display position of the first display by moving the first display in the first vertical direction based on the first distance and rotating the first display in the first rotational direction based on the first angular difference and the first tilt using the first adjustment actuator. At step 528, adjust a second display position of the second display by moving the second display in the second vertical direction based on the second distance and rotating the second display in the second rotational direction based on the second angular difference and the first tilt using the second adjustment actuator. method 500 may proceed back to step 506.

Figure 6:
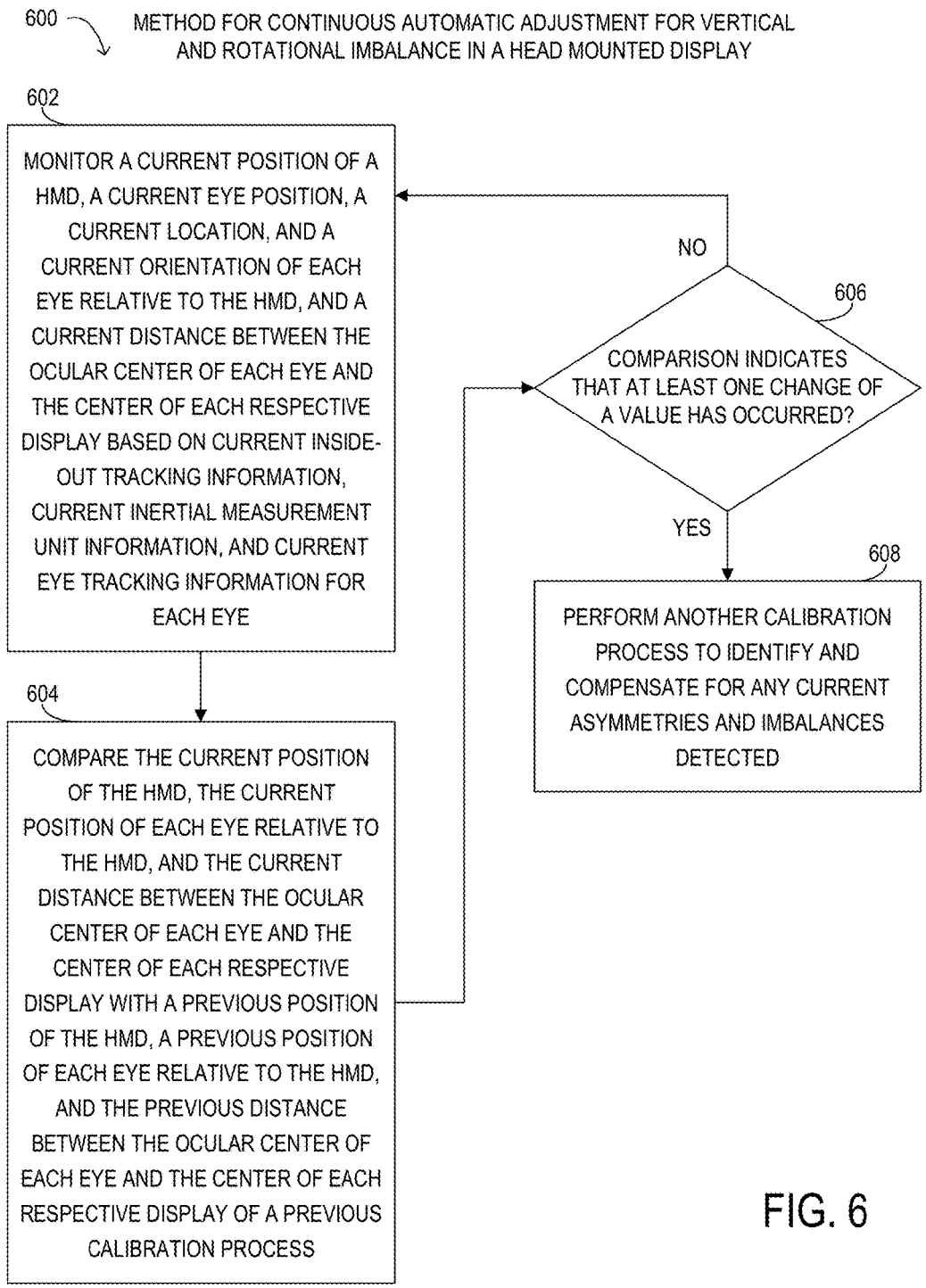
FIG. 6 depicts a flowchart of selected elements of an embodiment of a method for continuous automatic adjustment for vertical and rotational imbalance in a head mounted display.

FIG. 6 depicts a flowchart of selected elements of an embodiment of a method 600 for continuous automatic adjustment for vertical and rotational imbalance in a head mounted display. Method 600 may be performed by head mounted display 200, head mounted display 300, head mounted display 400, or information handling system 100 coupled to head mounted display 200, head mounted display 300, or head mounted display 400 previously described with reference to FIGS. 1, 2, 3, and 4, or another type of head mounted display or head mounted display system. It is noted that certain operations described in method 600 may be optional or may be rearranged in different embodiments.

Method 600 may begin at step 602, monitor a current position of a head mounted display, a current eye position, a current location, and a current orientation of each eye relative to the head mounted display, and a current distance between the ocular center of each eye and the center of each respective display based on current inside-out tracking information, current inertial measurement unit information, and current eye tracking information for each eye. At step 604, compare the current position of the head mounted display, the current position of each eye relative to the head mounted display, and the current distance between the ocular center of each eye and the center of each respective display with a previous position of the head mounted display, a previous position of each eye relative to the head mounted display, and the previous distance between the ocular center of each eye and the center of each respective display of a previous calibration process. At step 606, determine whether the comparison indicates that at least one value of the current position of the head mounted display, the current position of each eye relative to the head mounted display, or the current distance between the ocular center of each eye and the center of each respective display has changed compared to the value of the previous position of the head mounted display, the previous position of each eye relative to the head mounted display, or the previous distance between the ocular center of each eye and the center of each respective display. When the comparison indicates that at least one value has changed, method 600 may proceed to step 608. When the comparison indicates that none of the values have changed, method 600 may proceed back to step 602. At step 608, perform another calibration process to identify and compensate for any current asymmetries and imbalances detected.

Figure 7:
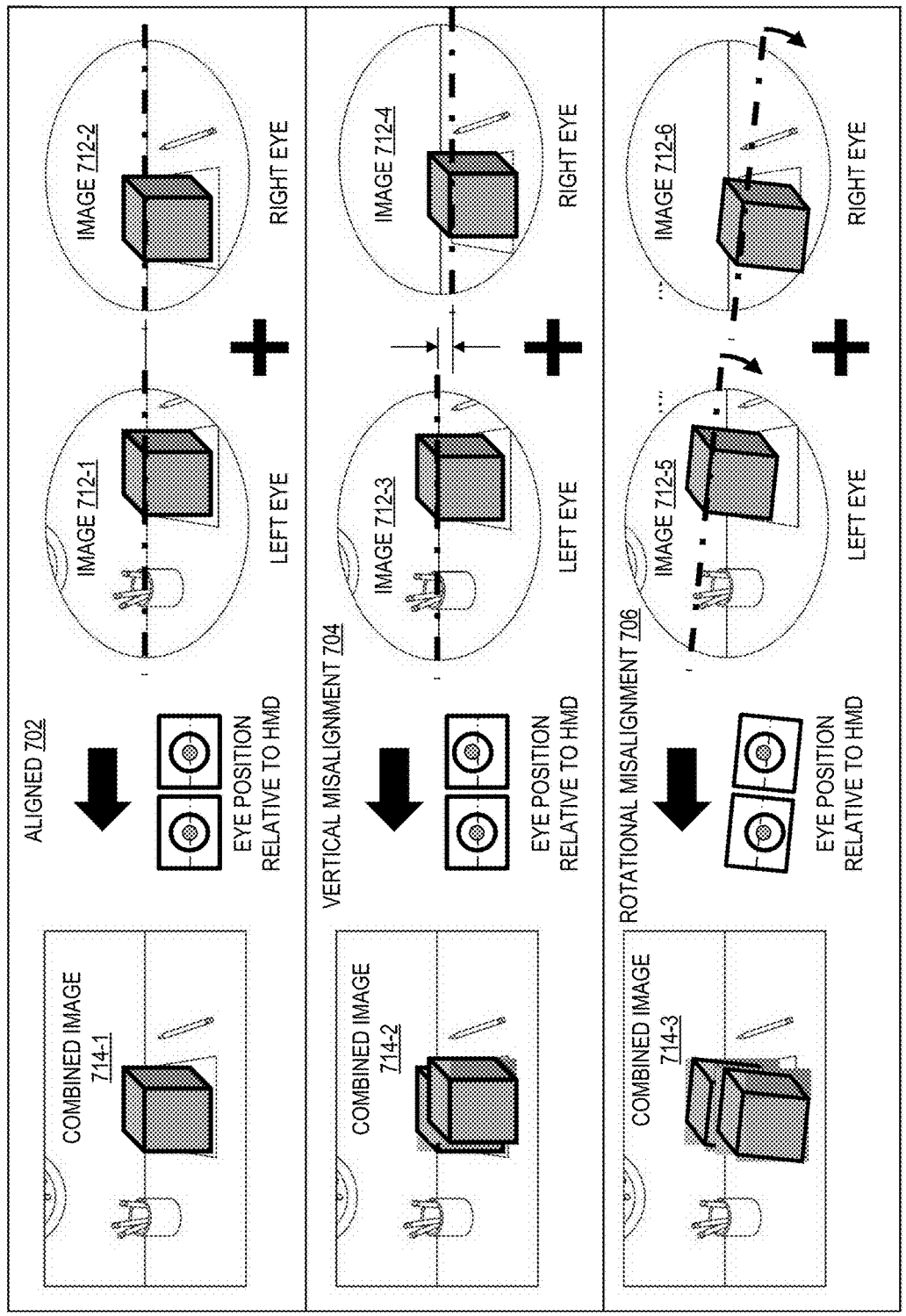
FIG. 7 are several eye-to-optics alignment and misalignment examples in a head mounted display.

FIG. 7 illustrates several examples of eye-to-optics alignment and misalignment in a head mounted display. In the aligned example 702, a virtual object in a left image 712-1 displayed on a left display for the left eye and the virtual object in a right image 712-2 displayed on a right display for the right eye are in vertical alignment as depicted by the left and right dashed alignment lines being at the same height. When the virtual object in the left image 712-1 and the virtual object in the right image 712-2 are vertically aligned, the virtual object in a combined image 714-1 is in focus.

In the vertical misalignment example 704, a virtual object in a left image 712-3 displayed on a left display for the left eye and the virtual object in a right image 712-4 displayed on a right display for the right eye are in vertical misalignment as shown by the left dashed alignment line of image 712-4 being at a lower height than the right dashed line of image 712-4 by a vertical distance shown by the vertical distance arrows. When the virtual object in the left image 712-1 and the virtual object in the right image 712-2 are vertically misaligned, the virtual object in a combined image 714-2 is not in focus and appears as two slightly misaligned virtual objects.

In the rotational misalignment example 706, a virtual object in a left image 712-5 displayed on a left display for the left eye and the virtual object in a right image 712-6 displayed on a right display for the right eye are in rotational misalignment as shown by the left dashed alignment line of image 712-5 and the right dashed line of image 712-6 having a rotational difference with a horizontal alignment line of the left display and the right display. When the virtual object in the left image 712-5 and the virtual object in the right image 712-6 are rotationally misaligned, the virtual object in a combined image 714-3 is not in focus and appears as two slightly misaligned virtual objects rotated by the rotational difference of the left and right dashed lines and the horizontal alignment line.

FIG. 8 is flowchart depicting selected elements of an embodiment of a method for automatic adjustment for vertical and rotational imbalance for a head mounted display. Method 800 may be performed by head mounted display 200, head mounted display 300, head mounted display 400, or information handling system 100 coupled to head mounted display 200, head mounted display 300, or head mounted display 400 previously described with reference to FIGS. 1, 2, 3, and 4, or another type of head mounted display or head mounted display system. It is noted that certain operations described in method 800 may be optional or may be rearranged in different embodiments.

Method 800 may begin at step 802, by determining a first eye position of a first eye of a user relative to a first display of a head mounted display that may be based on first captured eye tracking information associated with the first eye from a first eye tracking sensor of the head mounted display. At step 804, determining a second eye position of a second eye of the user relative to a second display of the head mounted display that may be based on second captured eye tracking information associated with the second eye from a second eye tracking sensor of the head mounted display. At step 806, rendering a virtual object to a first ideal image by moving the virtual object in a first vertical direction and rotating the virtual object in a first rotational direction that may be based on the first eye position and a tilt of the head mounted display. At step 808, rendering the virtual object to a second ideal image by moving the virtual object in a second vertical direction and rotating the virtual object in a second rotational direction that may be based on the second eye position and the tilt of the head mounted display. At step 810, determining whether the virtual object may fit within the first ideal image and the virtual object may fit within the second ideal image. At step 812, when the virtual object may fit within the first ideal image and the virtual object may fit within the second ideal image, displaying the first ideal image on the first display and the second ideal image on the second display.

Figure 9:
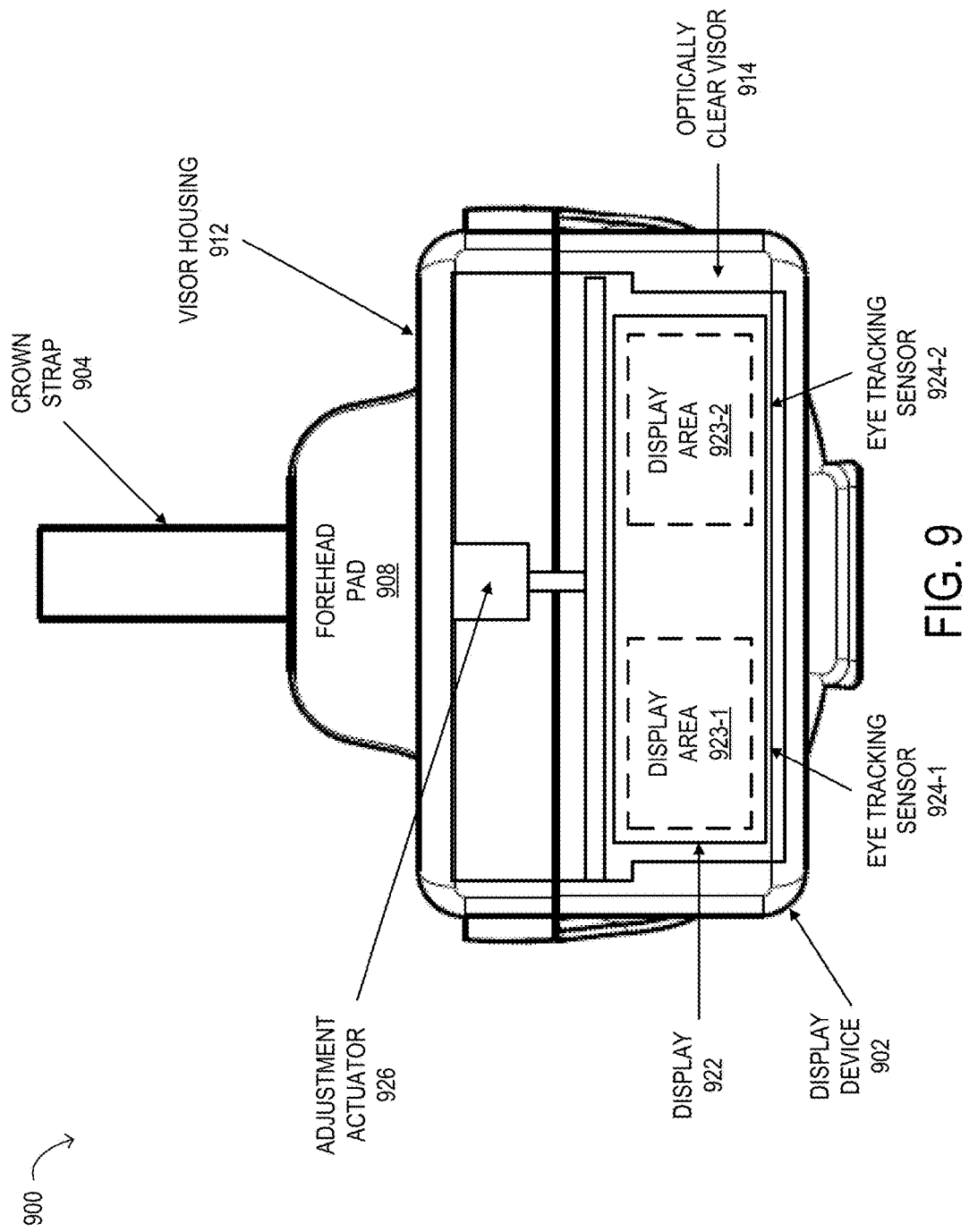
FIG. 9 is a front view of selected elements of an embodiment of a head mounted display.

Turning now to FIG. 9, a front view of selected elements of an embodiment of a head mounted display 900 is depicted. Head mounted display 900 is structurally and functionally similar to head mounted display 200 described above with reference to FIG. 2. Head mounted display 900 includes a display device 902, a crown strap 904, a forehead pad 908, a visor housing 912, and an optically clear visor 914 coupled to visor housing 912. Display device 902 may include various components including a display 922, eye tracking sensors 924 including eye tracking sensors 924-1 and 924-2, an adjustment actuator 926, and lenses (not illustrated), which may be in visor housing 912. Display 922, eye tracking sensors 924, and adjustment actuator 926 are structurally and functionally similar to one of displays 322, eye tracking sensors 324, and one of adjustment actuators 326 described above with reference to FIG. 3. Display 922 includes a display area 923-1 and a display area 923-2, which may be associated with a respective eye of a user. For example, display area 923-1 may be associated with the right eye and display area 923-2 may be associated with the left eye. Each display area 923 may also be associated with a respective lens for a respective eye of a user. For example, display area 923-1 may be associated with a right eye lens for the right eye and display area 923-2 may be associated with a left eye lens for the left eye. Each display area 923 may represent a portion of display 922 that is visible to a respective eye of a user through a respective lens. Each eye tracking sensor 924 may be located proximate a perimeter of each respective lens, proximate a bottom portion of each lens, or another location of each respective lens. Each eye tracking sensor 924 may be associated with a respective eye of a user. For example, eye tracking sensor 924-1 may be associated with the right eye and eye tracking sensor 924-2 may be associated with the left eye. Adjustment actuator 926 may be coupled to display 922. Adjustment actuator 926 may mechanically adjust a position of display 922. Adjustment actuator 926 may mechanically adjust the position of display 922 by moving the position of display 922 in a vertical direction and rotating the position of display 922 in a rotational direction. Head mounted display 900 may also include an inside-out tracking device to capture inside-out tracking information relative to a global ground coordinate associated with head mounted display 900, an inertial measurement unit to capture inertial measurement unit information associated with head mounted display 900, and one or more user input interfaces. Head mounted display 900 may be coupled to an information handling system such as information handling system 100.

As previously described, a user may place head mounted display 900 on their head with display device 902 positioned in front of their face and looking straight toward display 922 and provide user input to head mounted display 900 to begin a calibration process. During an identification phase of the calibration process, head mounted display 900 may determine a position of head mounted display 900 and a tilt of head mounted display 900 relative to global ground coordinate based on inertial measurement unit information captured by the inertial measurement unit and inside-out tracking information captured by the inside-out tracking device. Then, head mounted display 900 may normalize inertial measurement unit information of the inertial measurement unit and inside-out tracking information of the inside-out tracking device for an upright position of head mounted display 900 based on the tilt of head mounted display 900. Next, head mounted display 900 may identify a right eye position, a right eye location, and a right eye orientation of the right eye relative to the right display area 923-1 based on eye tracking information from the right eye tracking sensor 924-1, and a left eye position, a left eye location, and a left eye orientation of the left eye relative to the left display area 923-2 based on eye tracking information from the left eye tracking sensor 924-2. Head mounted display 900 may determine a first distance between an ocular center of the right eye and a center of the right display area 923-1 based on the right eye position of the right eye, and a second distance between an ocular center of the left eye and a center of the left display area 923-2 based on the left eye position of the left eye. Head mounted display 900 may also determine a first angular difference between an angle of the right eye relative to head mounted display 900 and an angle of the right display area 923-1 relative to head mounted display 900 based on the right eye position of the right eye, and a second angular difference between an angle of the left eye relative to head mounted display 900 and an angle of the left display area 923-2 relative to head mounted display 900 based on the left eye position of the left eye.

Next, head mounted display 900 may enter a compensation phase of the calibration process. During the compensation phase of the calibration process, head mounted display 900 may render a virtual object to a first ideal image for the right eye by moving the virtual object in a first vertical direction based on the first distance and the right eye position and rotating the virtual object in a first rotational direction based on the first angular difference, the right eye position, and the tilt of head mounted display 900 to bring the virtual object in focus to the ocular center of the right eye. Head mounted display 900 may also render the virtual object to a second ideal image for the left eye by moving the virtual object in a second vertical direction based on the second distance and the left eye position and rotating the virtual object in a second rotational direction based on the second angular difference, the left eye position, and the tilt of head mounted display 900 to bring the virtual object in focus to the ocular center of the left eye. Next, head mounted display 900 may determine whether the virtual object fits within the first ideal image and the virtual object fits within the second ideal image. When the virtual object fits within the first ideal image and the virtual object fits within the second ideal image, head mounted display 900 may display the first ideal image on the right display area 923-1 of display 922 and the second ideal image on the left display area 923-2 of display 922.

In some embodiments, head mounted display 900 may use mechanical compensation to resolve vertical distances and angular differences. When at least one of a portion of the virtual object may be outside the first ideal image and the virtual object may be outside the second ideal image, head mounted display 900 may adjust the position of display 922 by moving display 922 in a vertical direction and rotating display 922 in a rotational direction using adjustment actuator 926 based on the first distance, the first angular difference, the right eye position, the second distance, the second angular difference, the left eye position, and the tilt of head mounted display 900.

When head mounted display 900 has adjusted the position of the right display area 923-1 and the position of the left display area 923-2, head mounted display 900 may re-run the identification and calibrations phases of the calibration process to ensure that the virtual image is in focus and fits within the right and left rendered ideal images. Once the virtual image is in focus and fits within the right and left rendered ideal images, head mounted display 900 may save the initial calibration information of the initial calibration process.

During operation, head mounted display 900 may enter a continuous usage phase of the automatic adjustment for vertical and rotational imbalance process for head mounted display 900. Head mounted display 900 may monitor a current position of head mounted display 900, a current eye position of each eye relative to head mounted display 900, a current orientation of each eye relative to head mounted display 900, a current distance between the ocular center of each eye and the center of each respective display area 923, and a current angular difference between an angle of each eye relative to head mounted display 900 based on current inside-out tracking information captured by the inside-out tracking device, current inertial measurement unit information captured by the inertial measurement unit, and current eye tracking information for each eye captured by each respective eye tracking sensor 924. Head mounted display 900 may compare the current position of head mounted display 900, the current position of each eye relative to head mounted display 900, the current orientation of each eye relative to head mounted display 900, the current distance between the ocular center of each eye and the center of each respective display area 923, and the current angular difference between the angle of each eye relative to head mounted display 900 with the previous position of head mounted display 900, the previous position of each eye relative to head mounted display 900, the previous orientation of each eye relative to head mounted display 900, the previous distance between the ocular center of each eye and the center of each respective display area 923, and the previous angular difference between the angle of each eye relative to head mounted display 900 of the previous calibration information. When the comparison indicates that one or more of the current position of head mounted display 900, the current position of each eye relative to head mounted display 900, the current orientation of each eye relative to head mounted display 900, the current distance between the ocular center of each eye and the center of each respective display area 923, and the current angular difference between the angle of each eye relative to head mounted display 900 have changed from their previous values, head mounted display 900 may run another calibration process to identify and compensate for any current asymmetries and imbalances detected.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A head mounted display, comprising:
    a first display;
    a second display;
    a first eye tracking sensor to capture eye tracking information associated with a first eye of a user wearing the head mounted display;
    a second eye tracking sensor to capture eye tracking information associated with a second eye of the user; and a controller operable to:
  determine a first eye position of the first eye relative to the first display based on first captured eye tracking information associated with the first eye from the first eye tracking sensor;
  determine a second eye position of the second eye relative to the second display based on second captured eye tracking information associated with the second eye from the second eye tracking sensor;
  render a virtual object to a first ideal image by movement of the virtual object in a first vertical direction based on the first eye position;
  render a virtual object to a second ideal image by movement of the virtual object in a second vertical direction based on the second eye position;
  determine whether the virtual object fits within the first ideal image and the virtual object fits within the second ideal image; and
  when the virtual object fits within the first ideal image and the virtual object fits within the second ideal image, display the first ideal image on the first display and the second ideal image on the second display;
wherein the controller is further operable to, when one or more of a portion of the virtual object is outside the first ideal image and a portion of the virtual object is outside the second ideal image:
  adjust a first display position of the first display by either: (i) movement of the first display in the first vertical direction using a first adjustment actuator of the head mounted display based on a first distance between an ocular center of the first eye and a center of the first display and the first eye position, or (ii) rotation of the first display in a first rotational direction using a first adjustment actuator of the head mounted display based on a first angular difference between an angle of the first eye relative to the head mounted display and an angle of the first display relative to the head mounted display, the first eye position, and a first tilt of the head mounted display; and
  adjust a second display position of the second display by either: (i) movement of the second display in the second vertical direction using a second adjustment actuator of the head mounted display based on a second distance between an ocular center of the second eye and a center of the second display and the second eye position, or (ii) rotation of the second display in the second rotational direction using a second adjustment actuator of the head mounted display based on a second angular difference between an angle of the second eye relative to the head mounted display and an angle of the second display relative to the head mounted display, the second eye position, and the first tilt.

2. The head mounted display of claim 1, wherein the controller is further operable further to:
  determine a first distance between an ocular center of the first eye and a center of the first display based on the first eye position; and
  determine a second distance between the ocular center of the second eye and a center of the second display based on the second eye position,
  wherein the movement of the virtual object in the first vertical direction is further based on the first distance, and
  wherein the movement of the virtual object in the second vertical direction is further based on the second distance.

3. The head mounted display of claim 1, wherein the controller is further operable to:
  determine a first angular difference between an angle of the first eye relative to the head mounted display and an angle of the first display relative to the head mounted display based on the first eye position; and
  determine a second angular difference between an angle of the second eye relative to the head mounted display and an angle of the second display relative to the head mounted display based on the second eye position,
  wherein the render of the virtual object to the first ideal image further comprises rotation of the virtual object in a first rotational direction based on the first angular difference and a first tilt of the head mounted display, and
  wherein the render of the virtual object to the second ideal image further comprises rotation of the virtual object in a second rotational direction based on the second angular difference and the first tilt of the head mounted display.

4. The head mounted display of claim 1, further comprising:
  an inside-out tracking device to capture inside-out tracking information relative to a global ground coordinate associated with the head mounted display; and
  an inertial measurement unit to capture inertial measurement unit information associated with the head mounted display, and wherein the controller is further operable to:
  monitor a current position of the head mounted display, a third eye position of the first eye, and a fourth eye position of the second eye based on current inside-out tracking information captured by the inside-out tracking device, current inertial measurement unit information captured by the inertial measurement unit, third eye tracking information captured by the first eye tracking sensor, and fourth eye tracking information captured by the second eye tracking sensor;
  determine whether the current position of the head mounted display, the third eye position, and the fourth eye position, have changed from a previous position of the head mounted display, the first eye position, and the second eye position; and
  when at least one of the current position of the head mounted display, the third eye position, and the fourth eye position has changed position, perform another calibration process to compensate for the changes.

5. The head mounted display of claim 4,
wherein the controller is further operable to:
  determine a first position of the head mounted display and a first tilt of the head mounted display based on first inside-out tracking information captured by the inside-out tracking device and first inertial measurement unit information captured by the inertial measurement unit.

6. The head mounted display of claim 4, wherein the eye tracking information comprises:
  a position of an eye;
  a location of the eye;
  a pupil location of the eye;
  an ocular center of the eye;
  an angle of the eye; and
  a direction of gaze of the eye,
  wherein the inside-out tracking information associated with the head mounted display comprises:

a position of the head mounted display; and
a location of the head mounted display, and
wherein the inertial measurement unit information associated with the head mounted display comprises:
a position of the head mounted display;
an orientation of the head mounted display;
a linear acceleration of the head mounted display; and
an angular velocity of the head mounted display.

7. A method, comprising:
determining a first eye position of a first eye of a user relative to a first display of a head mounted display based on first captured eye tracking information associated with the first eye from a first eye tracking sensor of the head mounted display;
determining a second eye position of a second eye of the user relative to a second display of the head mounted display based on second captured eye tracking information associated with the second eye from a second eye tracking sensor of the head mounted display;
rendering a virtual object to a first ideal image by moving the virtual object in a first vertical direction based on the first eye position;
rendering a virtual object to a second ideal image by moving the virtual object in a second vertical direction based on the second eye position;
determining whether the virtual object fits within the first ideal image and the virtual object fits within the second ideal image;
when the virtual object fits within the first ideal image and the virtual object fits within the second ideal image, displaying the first ideal image on the first display and the second ideal image on the second display;
when one or more of a portion of the virtual object is outside the first ideal image and a portion of the virtual object is outside the second ideal image:
adjusting a first display position of the first display by either: (i) movement of the first display in the first vertical direction using a first adjustment actuator of the head mounted display based on a first distance between an ocular center of the first eye and a center of the first display and the first eye position, or (ii) rotation of the first display in a first rotational direction using a first adjustment actuator of the head mounted display based on a first angular difference between an angle of the first eye relative to the head mounted display and an angle of the first display relative to the head mounted display, the first eye position, and a first tilt of the head mounted display; and
adjusting a second display position of the second display by either: (i) movement of the second display in the second vertical direction using a second adjustment actuator of the head mounted display based on a second distance between an ocular center of the second eye and a center of the second display and the second eye position, or (ii) rotation of the second display in the second rotational direction using a second adjustment actuator of the head mounted display based on a second angular difference between an angle of the second eye relative to the head mounted display and an angle of the second display relative to the head mounted display, the second eye position, and the first tilt.

8. The method of claim 7, wherein the method further comprising:
determining a first distance between an ocular center of the first eye and a center of the first display based on the first eye position; and
determining a second distance between the ocular center of the second eye and a center of the second display based on the second eye position,
wherein moving the virtual object in the first vertical direction is further based on the first distance, and
wherein moving the virtual object in the second vertical direction is further based on the second distance.

9. The method of claim 7, wherein the method further comprising:
determining a first angular difference between an angle of the first eye relative to the head mounted display and an angle of the first display relative to the head mounted display based on the first eye position; and
determining a second angular difference between an angle of the second eye relative to the head mounted display and an angle of the second display relative to the head mounted display based on the second eye position,
wherein rendering the virtual object to the first ideal image further comprises rotating the virtual object in a first rotational direction based on the first angular difference and a first tilt of the head mounted display, and
wherein rendering the virtual object to the second ideal image further comprises rotating the virtual object in a second rotational direction based on the second angular difference and the first tilt of the head mounted display.

10. The method of claim 7, wherein the method further comprising:
monitoring a current position of the head mounted display, a third eye position of the first eye, and a fourth eye position of the second eye based on current inside-out tracking information captured by the inside-out tracking device, current inertial measurement unit information captured by the inertial measurement unit, third eye tracking information captured by the first eye tracking sensor, and fourth eye tracking information captured by the second eye tracking sensor;
determining whether the current position of the head mounted display, the third eye position, and the fourth eye position have changed from a previous position of the head mounted display, the first eye position, and the second eye position; and
when at least one of the current position of the head mounted display, the third eye position, and the fourth eye position has changed position, performing another calibration process to compensate for the changes.

11. The method of claim 7, wherein the method further comprising:
determining a first position of the head mounted display and a first tilt of the head mounted display based on first inside-out tracking information captured by an inside-out tracking device of the head mounted display and first inertial measurement unit information captured by an inertial measurement unit of the head mounted display.

12. A head mounted display, comprising:
a display including a first display area and a second display area;
a first eye tracking sensor to capture eye tracking information associated with a first eye of a user wearing the head mounted display;
a second eye tracking sensor to capture eye tracking information associated with a second eye of the user; and a controller operable to:
   determine a first eye position of the first eye relative to the first display area of the display based on first captured eye tracking information associated with the first eye from the first eye tracking sensor;
   determine a second eye position of the second eye relative to the second display area of the display based on second captured eye tracking information associated with the second eye from the second eye tracking sensor;
   render a virtual object to a first ideal image by rotation of the virtual object in a first rotational direction based on the first eye position;
   render a virtual object to a second ideal image by rotation of the virtual object in a second rotational direction based on the second eye position;
   determine whether the virtual object fits within the first ideal image and the virtual object fits within the second ideal image; and
   when the virtual object fits within the first ideal image and the virtual object fits within the second ideal image, display the first ideal image on the first display area of the display and the second ideal image on the second display area of the display;
   wherein the controller is further operable to, when one or more of a portion of the virtual object is outside the first ideal image and a portion of the virtual object is outside the second ideal image;
   adjust a display position of the display by movement of the display in a third vertical direction and rotation of the display in a third rotational direction using an adjustment actuator of the head mounted display based on the first eye position, the second eye position, and a first tilt of the head mounted display.

13. The head mounted display of claim 12, wherein the controller is further operable to:
   determine a first angular difference between an angle of the first eye relative to the head mounted display and an angle of the first display area relative to the head mounted display based on the first eye position;
   determine a second angular difference between an angle of the second eye relative to the head mounted display and an angle of the second display area relative to the head mounted display based on the second eye position;
   wherein the rotation of the virtual object in the first rotational direction is further based on the first angular difference and a first tilt of the head mounted display, and
   wherein the rotation of the virtual object in the second rotational direction is further based on the second angular difference and the first tilt of the head mounted display.

14. The head mounted display of claim 12, wherein the controller is further operable to:
   determine a first distance between an ocular center of the first eye and a center of the first display area based on the first eye position; and
   determine a second distance between the ocular center of the second eye and a center of the second display area based on the second eye position,
   wherein the render of the virtual object to the first ideal image further comprises movement of the virtual object in a first vertical direction based on the first distance, and
   wherein the render of the virtual object to the second ideal image further comprises movement of the virtual object in a second vertical direction based on the second distance.

15. The head mounted display of claim 12, further comprising:
   an inside-out tracking device to capture inside-out tracking information relative to a global ground coordinate associated with the head mounted display; and
   an inertial measurement unit to capture inertial measurement unit information associated with the head mounted display, and wherein the controller further to:
   monitor a current position of the head mounted display, a third eye position of the first eye relative to the first display area, a fourth eye position of the second eye relative to the second display area, based on current inside-out tracking information captured by the inside-out tracking device, current inertial measurement unit information captured by the inertial measurement unit, third eye tracking information captured by the first eye tracking sensor, and fourth eye tracking information captured by the second eye tracking sensor;
   determine whether the current position of the head mounted display, the third eye position, and the fourth eye position, have changed from a previous position of the head mounted display, the first eye position, and the second eye position; and
   when at least one of the current position of the head mounted display, the third eye position, and the fourth eye position has changed position, perform another calibration process to compensate for the changes.

* * * * *